United States Patent Office 3,644,587
Patented Feb. 22, 1972

3,644,587
CHEMICALLY CONTROLLING GRAFTING AND RUBBER PARTICLE SIZE IN MANUFACTURE OF HIGH IMPACT POLYSTYRENE USING A 2-STEP PROCESS
Arne Finberg, Edison, N.J., assignor to Mobil Oil Corporation
No Drawing. Filed Apr. 3, 1969, Ser. No. 813,269
Int. Cl. C08f 15/04
U.S. Cl. 260—880            4 Claims

ABSTRACT OF THE DISCLOSURE

High impact polystyrene is produced by free radical catalytic bulk prepolymerization of a solution of a rubber and styrene followed by suspension polymerization. Polymers having improved mechanical and rheological properties are produced by using in the bulk stage, an azo initiator during the phase inversion stage and adding a peroxide initiator just before the inversion is completed or thereafter.

BACKGROUND OF THE INVENTION

Field of the invention

This invention is concerned with an improved process for producing impact grade polystyrenes.

Description of the prior art

As is well known to those familiar with the art, impact grade polystyrene is usually produced by bulk prepolymerization of a styrene-rubber solution up to about 40 percent conversion and then completing the polymerization in an aqueous suspension. In order to obtain desirable polymer properties, a phase inversion must occur during the bulk stage, i.e., a change from polystyrene in rubber to a dispersion of rubber particles in polystyrene. In order for the phase inversion to be effected, the amount of grafting of polystyrene to rubber should be low before or during the inversion stage.

As is described in U.S. Pat. No. 2,694,692, the most prevalent method has been to use shear stirring. While shearing has been effective to cause phase inversion, the rubber is broken into particles that are too fine, i.e., less than 4 microns. This tends to decrease impact resistance. In accordance with this invention, phase inversion and subsequent grafting are effected by a chemical mechanism independent of stirring, resulting in good impact resistance and better rubber particle size.

SUMMARY OF THE INVENTION

This invention provides a process for producing impact grade polystyrene that comprises polymerizing a rubber and a styrene reactant in a bulk stage up to about 40 percent polymerization and completing the polymerization in an aqueous suspension system, wherein an azo compound catalyst is used in the bulk stage until phase inversion is substantially complete and thereafter a peroxide initiator is added.

DESCRIPTION OF SPECIFIC EMBODIMENTS

In the process of this invention, grafting of polystyrene on rubber particles is delayed until phase inversion is complete or nearly complete. This is accomplished by using an azo compound initiator (catalyst) in the early stages of the bulk polymerization. The azo compounds (as hereinafter defined) are resonance stabilized free radical initiators that have little activity to effect addition to the rubber double bond or chain transfer with the rubber. Thus, polymerization is initiated and phase inversion is effected, but no grafting of polystyrene on rubber occurs at moderate temperatures (20–150° C.). The peroxide catalysts, on the other hand, favor grafting.

Generally, phase inversion is completed when about 20 percent conversion has been reached. Thus, by varying the amount and the time of peroxide addition, the average rubber particle size is controlled to between about $5\mu$ and about $25\mu$.

The improved operation of this invention is applied to the two stage polymerization of a solution of a rubber in a styrene reactant. The rubber used in making the thermoplastic compositions can be either a natural rubber such as pale crepe, or preferably a synthetic rubber, such as polybutadiene or an SBR synthetic rubber (e.g., "cold SBR rubber"), a copolymer of butadiene and styrene which is usually derived from butadiene and styrene in proportions lying between 50:50 and 95:5 by weight. Elastomers produced from monovinyl-aromatic compounds other than styrene or dienes other than butadiene are also suitable providing, of course, that such rubbers are sufficiently monomer soluble, i.e., the rubbers used as starting materials should be substantially gel-free so as to dissolve in the monovinyl-aromatic compound.

The amount of rubber used is generally between about 2 and about 15 percent by weight of the styrene reactant. The optimum depends on the type of rubber used and on the properties required in the final high impact polymer.

The styrene reactant is a monovinyl benzene compound or a derivative thereof. The compositions contemplated include styrene and its polymerizable derivatives. such as the lower alkyl-substituted styrenes and chlorine-substituted derivatives. Typical styrene reactants are styrene, α-methylstyrene, p-methylstyrene, and m-chlorostyrene. Styrene is preferred in the prepolymerization stage. The desired amount of rubber is dissolved in the styrene reactant. Then, the resultant solution is subjected to bulk polymerization.

The azo compound initiator has the general structure R—N=N—R', wherein R and R' can be the same or different alkyl or aryl groups, which can have nitrile, carbonyl, hydroxyl, nitro, alkoxy, or halogen substituents. A particularly preferred azo compound initiator is 2,2'-azo-bis-isobutyronitrile (AIBN), primarily because it is more readily available commercially. Other utilizable azo compound initators, characterized in Polymer Handbook, Interscience Publishers (1966), chapter II, pp. 3–14, are 1,1'-azo-bis-1-cyclobutanenitrile;
2,2'-azo-bis-2-methylbutyronitrile;
4,4'-azo-bis-4-cyanopentanoic acid;
1,1'-azo-bis-1-cyclopentanenitrile;
2,2'-azo-bis-2-cyclopropylpropionitrile;
2,2'-azo-bis-2,3-dimethylbutyronitrile;
2,2'-azo-bis-2-methylvaleronitrile;
2,2'-azo-bis-2-cyclobutylpropionitrile;
azo-bis-isobutyramidine;
2,2'-azo-bis-methyl-2-methylpropionate;
azo-bis(1-carbomethoxy)-3-methylpropane;
1,1'-azo-bis-1-phenylethane;
phenyl-azo-di-phenylmethane;
3-bromophenyl-azo-triphenylmethane;
4-hydroxyphenyl-azo-triphenylmethane;
2-nitrophenyl-azo-triphenylmethane;
4-methoxyphenyl-azo-triphenylmethane; and
4-acetaminophenyl-azo-triphenylmethane.

The peroxide catalyst that is introduced during or subsequent to the phase inversion can be any organic peroxide having an activation temperature in the operating temperature range of the bulk polymerization stage. Such initiators are well known in the art, and include benzoyl peroxide, dicumyl peroxide, di-t-butyl peroxide, t-butyl peroxy pivalate and other peroxides as described in Polymer Handbook, Interscience Publishers (1966).

The amount of azo compound initiator used will be between about 0.0005 percent and about 0.500 percent by weight of the bulk polymerization mixture. The amount of peroxide initiator used will be between about 0.0005 percent and about 0.500 percent by weight. Each initiator can be introduced into the bulk stage polymerization in a single addition or it can be added incrementally.

If desired, a compound functioning as polymerization modifier, such as tertiary dodecyl mercaptan, may be added. Also there may be added other materials, for example, plasticizers or lubricants such as dibutyl sebacate, dioctyl phthalate, butyl stearate, stearic acid, or a mineral oil such as white oil.

In the bulk polymerization, the solution of rubber in styrene is gently agitated and heated to a polymerization temperature. This is usually between about 50° C. and about 150° C., preferably, between about 70° C. and about 105° C. During polymerization, gentle agitation is continued until 20 to 40 percent of the styrene reactant is polymerized. The total solids content at the end of the bulk stage is between about 35 to 40 percent by weight.

The suspension polymerization is carried out in the conventional manner by dispersing the prepolymer from the first stage in an aqueous medium containing water-soluble suspension agents, such as polyvinyl alcohol, or a difficultly soluble phosphate suspension agent, such as hydroxy apatite. Polymerization temperature can be from 80 to 120° C., although higher temperatures up to about 150° C. can be used toward the end of the polymerization reaction.

EXAMPLE 1

This example demonstrates typical prior art procedure. A solution of 840 g. of polybutadiene rubber (20% 1,2; 70% trans 1,4; 10% cis 1,4) in 12,000 g. of styrene was prepared and 84 g. of white oil (Nujol) and 6 g. of benzoyl peroxide were added. The resultant solution was subjected to polymerization, using an agitation (anchor stirrer) of 90 r.p.m., at 190° F. for six hours. After five and a half hours, 9 g. of dicumyl peroxide was added and after five and three-fourths hours, 18 g. of t-dodecyl mercaptan was added. The batch was then transferred to a second vessel and dispersed in 12,000 g. of water, at 190° F., containing 24 g. of polyvinyl alcohol and 60 g. of NaCl. The suspension was heated up to 265° F. (stirring at 240 r.p.m.) and maintained at this temperature for twelve hours, attaining a conversion greater than 99 percent.

The mechanical and rheological data of the polymer are presented in Table 1. An extruded strand of this material had an extremely rough surface and high "die swell."

EXAMPLE 2

A bulk-suspension polymerization was carried out, as described in Example 1, using the same recipe, except that 4.06 g. of AIBN (azo-bis-isobutyronitrile) was used as the initiator in place of benzoyl peroxide and 6.0 g. of benzoyl peroxide were added after three hours of polymerization. Pertinent data are set forth in Table 1.

EXAMPLE 3

A bulk-suspension polymerization was carried out, as described in Example 1, using the same recipe, except that an additional 6 g. of benzoyl peroxide was added after three hours of polymerization. Pertinent data are set forth in Table 1.

EXAMPLE 4

A bulk-suspension polymerization was carried out, as described in Example 1, using the same recipe, except that 4.06 g. of AIBN was used as the initiator in place of benzoyl peroxide and another 4.06 g. of AIBN was added after three hours of polymerization. Pertinent data are set forth in Table 1.

EXAMPLE 5

A bulk-suspension polymerization was carried out, as described in Example 1, using the same recipe including benzoyl peroxide initiator, except that 4.06 g. of AIBN was added after three hours of polymerization. Pertinent data are set forth in Table 1.

EXAMPLE 6

A bulk-suspension polymerization was carried out, as described in Example 1, using the same recipe, except that 4.06 g. of AIBN was used as the initiator in place of benzoyl peroxide, 6.0 g. of benzoyl peroxide was added after three hours of polymerization, and the second stage suspension polymerization was carried out at 265° F. for eight hours and then at 280° F. for four hours at 240 r.p.m. Pertinent data are set forth in Table 1.

EXAMPLE 7

A bulk-suspension polymerization was carried out, as described in Example 1, using the same recipe, except that 2.72 g. of AIBN and 2 g. of benzoyl peroxide was used as initiators in place of benzoyl peroxide alone and another 6 g. of benzoyl peroxide was added after three hours, of polymerization. Pertinent data are set forth in Table 1.

TABLE 1

| Example number | 1 | 2 | 3 | 4 | 5 | 6 | 7 |
|---|---|---|---|---|---|---|---|
| Yield strength, p.s.i. | 3,962 | 4,076 | 4,247 | 4,090 | 3,180 | 4,130 | 3,640 |
| Break strength, p.s.i. | 4,162 | 4,118 | 3,962 | 4,456 | 3,260 | 4,660 | 3,960 |
| Elongation at break, percent | 23 | 44 | 31 | 34 | 41 | 49 | 32 |
| Izod impact, ft.-lb/¼" notch, ASTM | 1.2 | 1.6 | 1.7 | 1.1 | 1.3 | 1.6 | 1.5 |
| ASTM Melt Index: | | | | | | | |
| G (g./10 min.) | 2.7 | 9.9 | 12.8 | 11.8 | 7.6 | 3.0 | 4.7 |
| L (g./10 min.) | 3.4 | 11.4 | 11.0 | 15.3 | 8.5 | 4.4 | 5.5 |
| Appearance of extrudate | (1) | (2) | (1) | (2) | (1) | (2) | (2) |
| Newtonian viscosity ×10⁻⁴ poise | 7.7 | 2.4 | 1.9 | 1.6 | 4.8 | 7.6 | 7.6 |
| Elasticity factor, percent | 83.7 | 20.3 | 31.1 | 22.9 | 13.3 | 0 | 3.9 |
| Vicat softening, ° C | 92 | 90 | 91.2 | 93 | 90 | 94.4 | 90 |
| Max. rubber particle size | HD* | 12 | 4 | 12 | HD* | 12 | 8 |

¹ Rough.   ² Smooth.

NOTE.—HD*=Heterogeneous dispersed, irregular shaped rubber particles.

Photomicrographs were taken of the final beads of each example. Observations were made as to rubber particle shape and size. In the examples wherein benzoyl peroxide was the sole initiator, the rubber particles were non-spherical and irregularly dispersed (Example 1), irregularly shaped (Example 5), or spherical but of too small particle size (Example 3). In all runs in which AIBN was the initiator, rubber particles were spherical and evenly dispersed. The particle size was 5–15µ and overall properties were improved. Example 7 illustrates how particle size can be controlled by adding a small amount of peroxide during early stages of the bulk polymerization.

In Table 2, are set forth data from Gel-Permeation Chromatographic analysis of products of Examples 4, 2, 3, and 5, comparing the effect of the initial initiator. The use of an azo compound initiator from the start of the bulk stage until phase inversion is substantially complete ular weight distribution, thus improving processing properties. Materials with a narrow distribution ($\overline{M}_w/\overline{M}_n$) produce less die swell of the extrudate during processing. The explanation for this is found in the contribution of the higher moments. Since the swelling of the extrudate increases linearly with the $\overline{M}_z\overline{M}_z+1/\overline{M}_w$, a low ratio is required for extrusion grade impact polystyrene. This is achieved by using the azo compound initiator during the first three hours of the bulk polymerization.

TABLE 2

| Example number | Initiator combination | $\overline{M}_v \times 10^5$ | $\overline{M}_n \times 10^4$ | $\overline{M}_w \times 10^5$ | $\overline{M}_z \times 10^5$ | $\overline{M}_{z+1} \times 10^5$ | $\overline{M}_z\overline{M}_{z+1} \times 10^{10}$ | $\dfrac{\overline{M}_z\overline{M}_{z+1}}{\overline{M}_w} \times 10^5$ | $\overline{M}_w/\overline{M}_n$ |
|---|---|---|---|---|---|---|---|---|---|
| 4 | A–A | 1.197 | 5.292 | 1.362 | 2.970 | 5.193 | 15.423 | 11.320 | 2.575 |
| 2 | A–B | 1.467 | 5.906 | 1.714 | 4.907 | 12.58 | 61.780 | 36.004 | 2.903 |
| 3 | B–B | 1.639 | 6.297 | 2.241 | 99.69 | 495.8 | 49426.3 | 22062 | 3.610 |
| 5 | B–A | 2.079 | 6.976 | 3.088 | 149.3 | 516.7 | 77143.3 | 24981 | 4.427 |

NOTE.—A=AIBN during 0–3 hrs. prepolymerization period; -A=AIBN during 3–6 hrs. prepolymerization period; B=Benzoyl peroxide during 0–3 hrs. prepolymerization period; -B=Benzoyl peroxide during 3–6 hrs. prepolymerization period.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for producing impact grade polystyrene that comprises polymerizing a rubber and a styrene reactant using between about 2 percent and about 15 percent rubber by weight of styrene reactant, at a temperature between about 50° C. and about 150° C., in bulk stage to about 20 percent to about 40 percent polymerization and completing the polymerization at between about 80° C. and about 150° C. in an aqueous suspension system, wherein between about 0.0005 percent and about 0.500 percent of an azo compound initiator is used in the bulk stage until phase inversion is substantially complete and thereafter between about 0.0005 percent and about 0.500 percent, by weight, of a peroxide initiator is added.

2. The process of claim 1, wherein said azo compound initiator is 2,2′-azo-bis-isobutyronitrile and said peroxide initiator is benzoyl peroxide.

3. The process of claim 1, wherein said rubber is polybutadiene rubber or a copolymer of butadiene and styrene in proportions lying between 50:50 and 95:5 by weight, and said styrene reactant is styrene.

4. The process of claim 2, wherein said rubber is polybutadiene rubber or a copolymer of butadiene and styrene in proportions lying between 50:50 and 95:5 by weight, and said styrene reactant is styrene.

References Cited

UNITED STATES PATENTS 3,330,786   7/1967   Finestone et al. _____ 260—880
3,346,520  10/1967   Lee _____ 260—880
3,448,175   6/1969   Doak et al. _____ 260—880

HARRY WONG, JR., Primary Examiner

U.S. Cl. X.R.

252—43; 260—4, 31.2, 31.6